United States Patent [19]
Cornelissen

[11] Patent Number: 5,940,540
[45] Date of Patent: *Aug. 17, 1999

[54] METHODS OF AND SYSTEMS FOR COMPRESSION AND DECOMPRESSION THAT PREVENT LOCAL DATA EXPANSION

[75] Inventor: Petrus A. M. Cornelissen, Venlo, Netherlands

[73] Assignee: Oce-Nederland B.V., MA Venlo, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/657,667

[22] Filed: May 31, 1996

[30] Foreign Application Priority Data

Jun. 2, 1995 [NL] Netherlands ............... 1000489

[51] Int. Cl.$^6$ .................................................. H04N 1/41
[52] U.S. Cl. ...................................... 382/245; 358/261.1
[58] Field of Search .................... 358/426–427, 358/261.1–261.2; 382/245–246, 232–233

[56] References Cited

U.S. PATENT DOCUMENTS

| | | | |
|---|---|---|---|
| 3,394,352 | 7/1968 | Wernikoff et al. | 340/172.5 |
| 3,560,639 | 2/1971 | Centanni | 178/6 |
| 3,748,379 | 7/1973 | Epstein et al. | 178/6 |
| 3,956,578 | 5/1976 | de Loye et al. | 178/6 |
| 4,163,260 | 7/1979 | Hisao et al. | 358/261 |
| 4,191,974 | 3/1980 | Ono et al. | 358/261 |
| 4,626,829 | 12/1986 | Hauck | 340/347 DD |
| 5,264,942 | 11/1993 | Shimotsuji et al. | 358/261.1 |
| 5,357,546 | 10/1994 | Meriwether et al. | 375/122 |
| 5,592,297 | 1/1997 | Van Dorsselaer | 358/261.1 |

OTHER PUBLICATIONS

Cook et al, IBM Technical Disclosure Bulletin, vol. 16, No. 3, pp. 928–929 (Aug. 1973).

Cook, IBM Technical Disclosure Bulletin, vol. 16, No. 11, pp. 3775–3776 (Apr. 1974).

*Primary Examiner*—Thomas D. Lee
*Assistant Examiner*—Stephen Brinich

[57] ABSTRACT

A method and system of compressing digital image data organized as successive data groups of bits, the contents of which are values of pixels of an image, by checking a first condition of whether a first data group has the same contents as one or more following data groups. If the first condition is satisfied, then the data groups are replaced, in a compression step, by a compression code representing these data groups. Otherwise, in a copying step, only the first data group is replaced by a code consisting of the contents of the data group. These steps are repeated for the next data groups. The method also adds an identification code for characterizing the nature of the code, but only when the compression step is carried out. A related method and system of decompression checks a first condition of whether an identification code is included in the compression codes. If the condition is satisfied, then decompression takes place, else copying takes place.

33 Claims, 7 Drawing Sheets

METHODS OF AND SYSTEMS FOR COMPRESSION AND DECOMPRESSION THAT PREVENT LOCAL DATA EXPANSION

BACKGROUND OF THE INVENTION

The invention relates to a method of compressing digital image data, comprising successive data groups of bits, the contents of which are the values of pixels of an image, in which method a check is made in a selection step whether a first condition is satisfied which at least stipulates that the data group has the same contents as one or more data groups following thereon, whereafter, if the first condition is satisfied, said data groups are replaced, in a compression step, by a compression code representing these data groups, and otherwise, in a copying step only the first data group is replaced by a code consisting of the contents of the data group, whereafter the above steps are repeated for the next data groups, the method also comprising an identification step for adding an identification code for characterizing the nature of the code.

The invention also relates to a system in which the method is applied.

Digital image data can be obtained, among other ways, by scanning a document with photosensitive sensors, e.g., CCDs. A document can be divided up into pixels by column and line scanning and then be represented by values corresponding to said pixels.

These values can in turn be represented by data groups of one or more bits. Either a number of bits together may represent a grey value or each bit can separately represent a black/white value of a pixel (a bitmap). In the case of a color scanner, the grey value could relate to a scanned color. A data group having different bits can therefore either reproduce a grey value or color value of a pixel corresponding to the data group, or reproduce a black/white value for pixels corresponding to each bit, e.g., as in the case of a half-tone image.

Digital image data of this kind are obtained, among other ways, in systems equipped with scanners, e.g., facsimile systems and digital copying machines. In addition, however, such digital image data can also be generated by special computers, e.g., word processors or electronic character systems.

Depending on the situation, there will be a need to store or transmit such data. However, with a conventional resolution of 300 dots per inch and only black or white pixels, an A4 document already requires 1 Mbyte or, in the case of an AO document, 16 Mbyte memory space or data for transmission. In such cases it is advantageous to compress the data with one of the many known compression methods, e.g., "predictive" coding, Q-coding or "READ" coding (Relative Address Coding: G4-facsimile standard).

However, these prior art compression methods appear to lead to complex compression and decompression circuits. The object of the method and system according to the invention is to provide a compression method which gives a simpler architecture.

Closer analysis shows that, irrespective of the compression method, one aspect contributing to the complexity of a compression or decompression system is the possibility of local and global data expansion.

Local data expansion occurs if a compression system temporarily generates a higher number of bits per unit of time than the number of bits that can be processed per unit of time. This occurs if there is little correlation between the data groups for compression. One compression method then adds more redundant code than is saved to the number of compressed bits. In the case, for example, of run length coding according to Group 2 Fax format, a number of bits are required to indicate the run length and a number of bits to show the data group from which the run length is constructed. In the case of image lines with short run lengths local data expansion can then occur.

Local data expansion also results in a decompression system temporarily asking for code at a higher tempo in order to generate pixels at a constant speed of data groups. To prevent the processing system or memory coupled thereto having to operate at these higher speeds, the code must be buffered.

If local data expansion takes too long, then global data expansion may occur. In that case, the number of bits required to compress a line or even an entire image is greater than the number of original bits required for the purpose. A situation of this kind is undesirable, since the code buffers may then possibly be too small. In addition there is a risk that the compressed image will no longer fit in a memory.

A check must therefore be made whether data expansion occurs. If data expansion is signalled, or if no compression can be achieved in this way, compression of the incoming data groups must be abandoned. The incoming data groups must then be directly copied in the code series. This series must then be preceded by a code indicating the number of copied data groups.

A method and system of this kind is described, for example, in Applicant's Netherlands patent application number 9201415, corresponding to copending U.S. patent application Ser. No. 08/375,512. Copying the data groups ensures that data expansion remains limited because compression is carried out only if compression cannot cause data expansion.

Nevertheless, the possibility thereof must be taken into account: copying requires extra data in the form of the code representing the number of copied data groups in order to indicate that data groups are involved in what is copied.

The detection and processing thereof will, however, involve extra overheads in both the code and the compression and decompression system requirements.

SUMMARY OF THE INVENTION

The object of the method and system according to the invention is completely to exclude the possibility of data expansion in order thus to arrive at a simpler method and architecture for data compression and decompression.

To this end, according to the invention, the identification step is carried out only when the compression step is carried out.

By adding an extra identification code solely in the compression step, no data expansion can occur. In the selection step, a check must be made whether compression can be achieved, including addition of an identification code. Only if that is the case is an identification code added. The number of generated bits per unit of time can then never be greater than the number of bits for processing per unit of time.

Because only the compression code obtained by compression is provided with an identification code, an image or part in which no compression is possible accordingly has no extra information added. The data groups concerned are then directly copied without supplementary identification code. Accordingly, no data expansion can occur in this way because identification code is added only where compression is carried out.

By reference to the presence of the identification code, an associated decompression system can determine that the code following thereon is a compression code which must be decompressed. Here again no data expansion can occur: for constant generation of data groups a decompression system will not have to demand a higher number of bits per unit of time.

On the other hand, if no identification code is added because the compression step is not selected, an associated decompression system knows that the added code does not need to be decompressed.

The method and system according to the invention thus normally operates in a copying mode. Only if compression is possible is the method and system temporarily and exceptionally switched over, by the identification code, to a compression mode. When no further compression is possible, no further identification code is generated and the method and system return to the default copying mode.

In a first embodiment of the method, the code comprises a predetermined number of bits. There is then no need for a terminating code to indicate the end of the compression code. The code following on the predetermined number of bits is then either an identification code or a copied data group.

When coding the number of consecutive data groups having the same contents, such as run length coding, this predetermined number of bits is determined by the maximum run length for coding. This then gives a further advantageous aspect of the first embodiment.

In a second alternative embodiment of the method, the compression code comprises a predetermined number of bits and in predetermined cases one or more predetermined repetition codes. In comparison to the first embodiment, the compression code can now extend over a larger number of bits than a predetermined number—although this has the limitation that an extension must consist of predetermined bits which at most can indicate that the associated compression (with the predetermined number) is repeated one or more times. The end of the compression code is in this case also recognizable, again without the need for a terminal code.

A further aspect of the second method is that the repetition code is identical to the identification code. As a result, no extra code is required.

Similarly, in the case of run length coding, the repetition code may be selected to be identical to the maximum run length for coding.

In this last aspect, it is again advantageous to terminate the compression code with the identification code if the run length is exactly equal to the maximum run length for coding. This is necessary so that during decompression it is possible to detect that there are no more run lengths. In this way there is no need for a code word for a run length of zero.

A further aspect of the said first and second methods is that a data group is replaced by another predetermined data group in the copying step if the data group is identical to the identification code. A series of bits which does not occur frequently must of course be selected for the identification code. However, too long a series will have an adverse effect on the attainable compression. By replacing one data group identical to the identification code by a further data group, although the compression obtained is not faultless, the length of the identification code can remain limited. Preferably, a similar data group is so selected that the distortion of the image remains minimal.

The run length coding can be extended to more complex embodiments. In an embodiment in which the pixels of an image are arranged in consecutive image lines, it is advantageous to have the bits of a data group originate from at least two adjacent image lines. In this circumstance, e.g., a data group will include two consecutive pixels from a first line in the image and two corresponding consecutive pixels from the same positions in an adjacent second line of the image. Such a data group represents a two-dimensional block in the image, thereby enabling two-dimensional compression.

As a result it is possible to use the correlation between the image elements in two directions. The method according to the invention is very suitable for a specific category of image information, namely where a bit of a data group corresponds to the value of a pixel of the image. In this case a bit represents, for example, a completely black or white image element. Images of this kind are designated bit maps.

Optimization of this embodiment of the method is obtained by coding by run length only the number of identical data groups of which the bits of a data group are identical to one another. For example: by coding only run lengths of two or more entirely white bytes (one byte being equivalent to 8 bits) and two or more entirely black bytes. A run length can also be coded by a byte: the first bit indicates the color, the other seven bits indicate the run length.

The size of the data groups for coding, and the size of the run lengths for coding, can be freely selected, e.g., 4, 8 or 16 bits. However, each change has a positive effect and a negative effect on the compression factor. It is advantageous to have the data groups organized as units of 4 bits where this lines up with image processing hardware operating with 4 bit words (nibbles).

The invention also relates to a method and system for decompressing image data as obtained by the method and system described hereinbefore.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein . . .

DETAILED DESCRIPTION OF THE PREFERRED EMBODIMENTS

Figure 1:
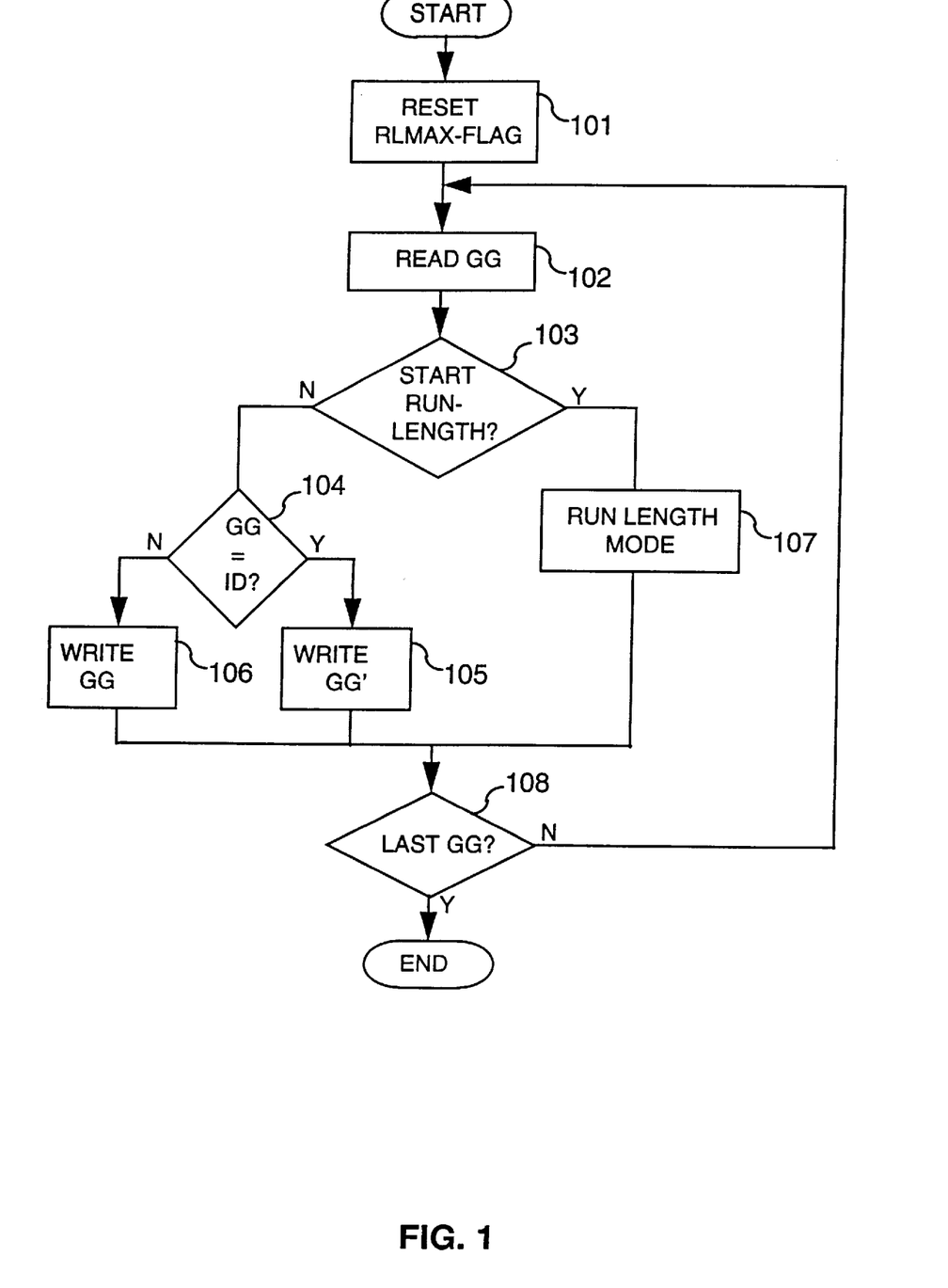
FIG. 1 illustrates a first embodiment of the compression method.

FIG. 1 illustrates a first embodiment of the compression process by reference to a flow diagram.

It is assumed that a bitmap is to be compressed on the basis of run length in one direction (unidimensional). The separate bits here represent "black" or "white" pixels. Other compression embodiments or specific embodiments of the run length compression can also be equally well combined with the method according to the invention. However, these alternatives will not be described in detail because it is within the ordinary level of skill in the art to use the method of the invention with alternative compression methods.

Firstly, initialization is carried out as required. An RLMAX flag is reset in a first step 101. This flag indicates whether the maximum run length for coding has been exceeded. If so, no identification code word ID is generated. The first data group GG is read in step 102. This may, for example, be a group of 4, 8 or 16 bits. In the embodiment described, a code word and a data group are both 8 bits long, e.g., are both one byte long.

In step 103 a check is made whether the compression conditions are satisfied, i.e., in this case the conditions for run length compression. For run length compression, there must be at least two consecutive data groups that are identical to one another.

If this is not so, step 104 checks whether the data group GG in question is identical to the identification code word ID.

If so, the data group is replaced in step 105 by another and preferably similar data group GG'.

It should be noted that with regard to the selection of an identification code word ID, it is preferable to select a data group which occurs as little as possible in the image. On the other hand, the identification code word ID should not be made too long; otherwise the compression factor suffers.

If the data group GG read is not identical to the identification code word ID, then in step 106 the data group GG is fully taken over into the series of code words CW for generation. The method described thus far is therefore equivalent to the standard copying of data groups GG in a copying mode. In this case, therefore, no extra code is added so that in this mode there can never suffer data expansion.

Figure 2:
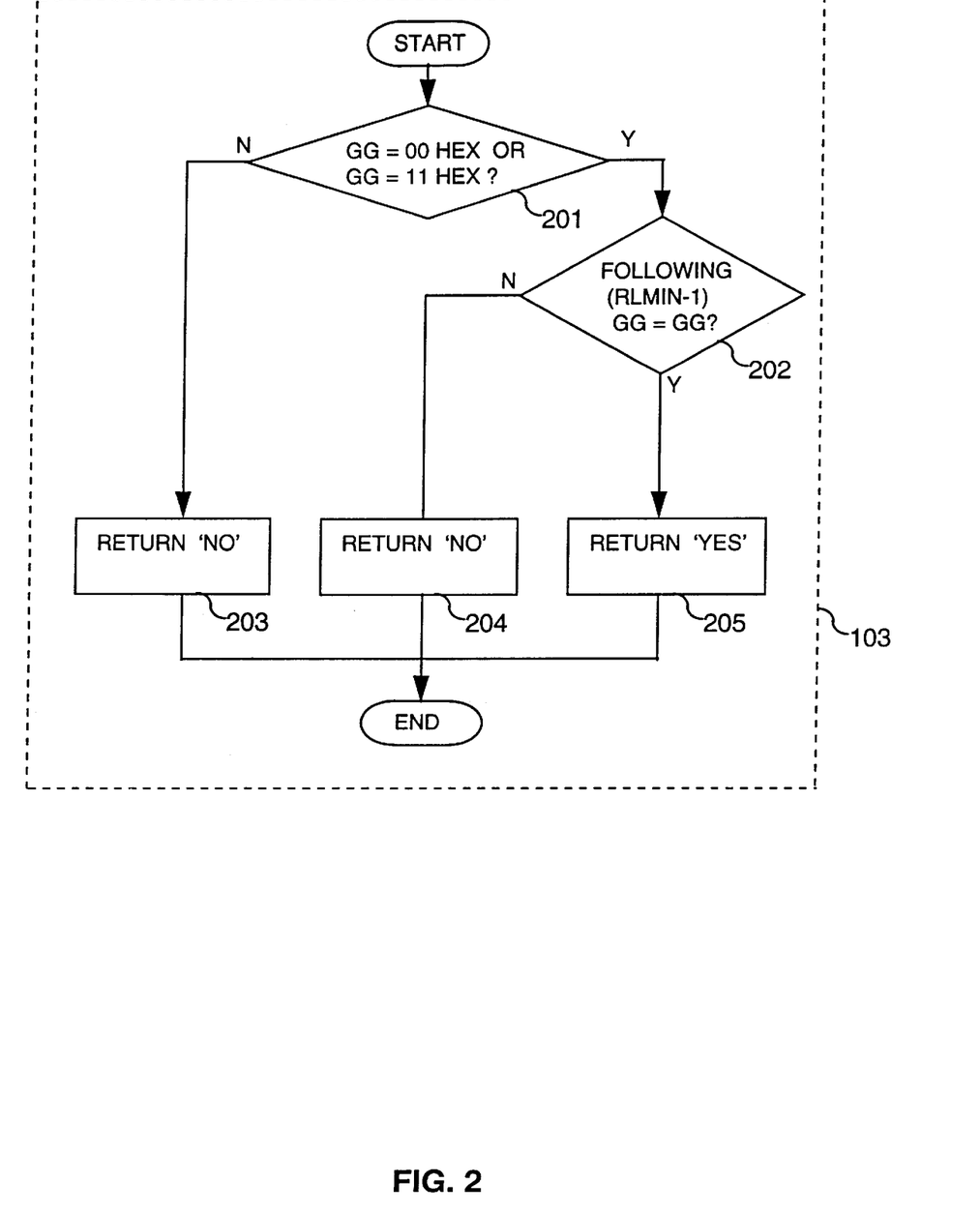
FIG. 2 is a further development of step 103 ("start run length?") shown in FIG. 1.

If, on the other hand, it is found in step 103 that at least two consecutive data groups are identical, then this data group GG is compressed in step 107. A check is also made whether subsequent data groups GG following thereon can also be compressed. This step will be explained further in FIG. 2. It is important that the addition of an identification code word ID does not take place until after step 103 and only if the conditions for compression are satisfied. The method does not proceed to the compression mode until the said conditions are satisfied. In the discussion of FIG. 2, it will be apparent that there is immediately a return of the previously mentioned copying mode if the said conditions are not satisfied in following data groups GG. This return takes place practically always without using a special code. Data expansion, again, will not occur.

On leaving the compression mode according to step 107, the above-described procedure is repeated for a following data group GG until it has been established in step 108 that the last data group GG has been read.

In FIG. 2, the step 103 ("start run length") of FIG. 1 is developed in detail. In this step 103, a check is made whether the data group GG satisfies the conditions for run length compression.

In step 201, a check is made whether all the bits of the data group GG are all identical and have the logic value "zero" or "one" ($00_{HEX}$ or $FF_{HEX}$). In this embodiment, in which each bit of a data group GG corresponds to a black or white pixel, only run lengths of two or more completely white bytes and completely black bytes are compressed. A run length is in this case coded with a byte; the first bit indicates the color, and the other seven bits the run length. There is therefore a maximum for the run length which can be coded with a code word. In this case run lengths between 2 and 128 can be coded. Longer run lengths must therefore be coded with a plurality of code words.

If the above condition is satisfied, a check is made in step 202 whether a data group following thereon is identical to the present data group. The minimum run length for coding can be set with the parameter RLMIN, and in this case RLMIN is equal to 2. Thus if a minimum of 2 bytes or both contain only "ZEROS" or both contain "ONES", step 103 is left, with the result that the conditions for compression are satisfied. The value of RLMIN is input by the fact that an identification code word is added in the compression step. The number of bits required for this may not be more than the original number of bits.

Figure 3:
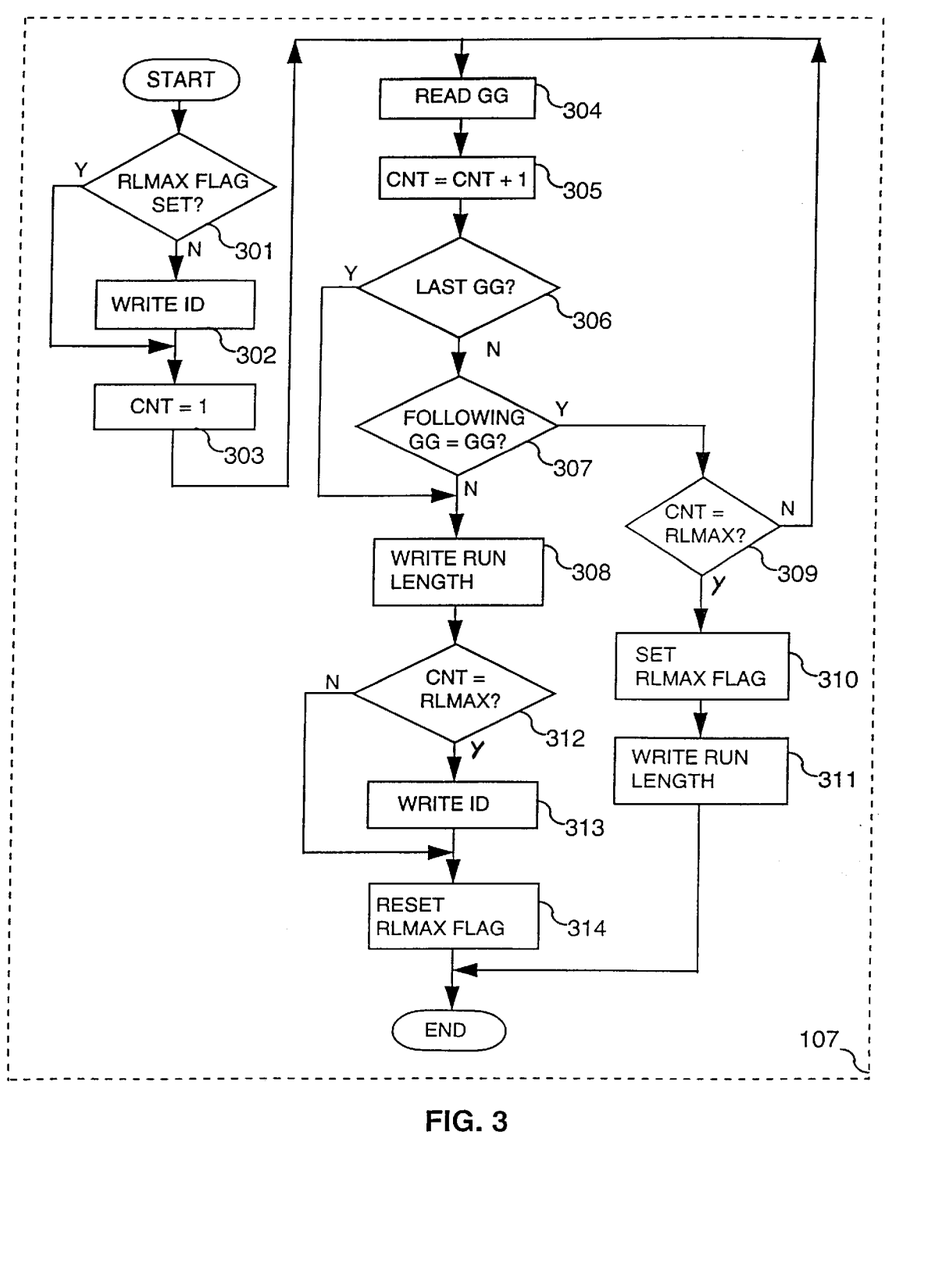
FIG. 3 is a further development of the step 107 ("run length mode") shown in FIG. 1.

In FIG. 3, step 107 ("run length mode") of FIG. 1 is developed in detail. This relates to the mode in which compression is carried out.

In step 301, a check is made whether the RLMAX flag has been set. This flag indicates whether the maximum run length RLMAX for coding has been reached in a preceding compression step while the conditions for compression for a following data group are still satisfied.

If this is the case, no identification code word ID is generated since the compression mode can be continued. This can be detected by an associated decompression method by the presence of the code for the maximum run length.

Otherwise, in step 302, an identification code word ID is generated to indicate that there is a transition from the copying mode to a compression mode.

In step 303 a run length counter CNT is initialized at 1 whereafter, in step 304, a following data group GG is read. The run length counter CNT is then increased in step 305. The data groups to be read in step 304 and step 307 relate to the data groups evaluated in step 103.

In step 306, a check is made whether the data group GG, read in step 304, is the last of the series for coding, e.g., of a line of an image or of the image itself.

If this is not the case, step 307 checks whether the following data group GG is identical to the present data group GG. If this is also not the case, then the run length is known and it can be added in step 308 to the code series CW. If, however, the following data group GG is still identical to the present data group, then the following data group GG will be read in step 304 and the above-described cycle repeated. The data group GG to be read in step 304 is then designated the present data group GG.

In this cycle, step 309 checks whether the run length counter CNT has not reached the maximum run length RLMAX for coding. If this is the case, then a plurality of run lengths must therefore be added successively. For this purpose, the above-mentioned RLMAX flag is set in step 310. This is used in a new compression cycle in step 301 in order to suppress the generation of the identification code word ID. In a corresponding decompression method, when the code for a maximum run length occurs the following codes also represent a run length. The maximum run length is added in step 311 to the code series whereafter the compression cycle is left.

If step 309 does not encounter the maximum run length, the run length is therefore added in step 308. The situation may arise in these circumstances that the run length is exactly identical to the maximum run length RLMAX. This is checked in step 312. In that case, the identification code word ID is also generated in step 313. The effect of this is that a corresponding decompression method can distinguish this situation from the one in which the run length exceeds the maximum run length RLMAX. In the latter case, only a code for the maximum run length RLMAX is encountered while in the other case this code is followed by an identification code word ID.

After resetting of the RLMAX flag in step 314 the compression cycle is concluded.

Figure 4:
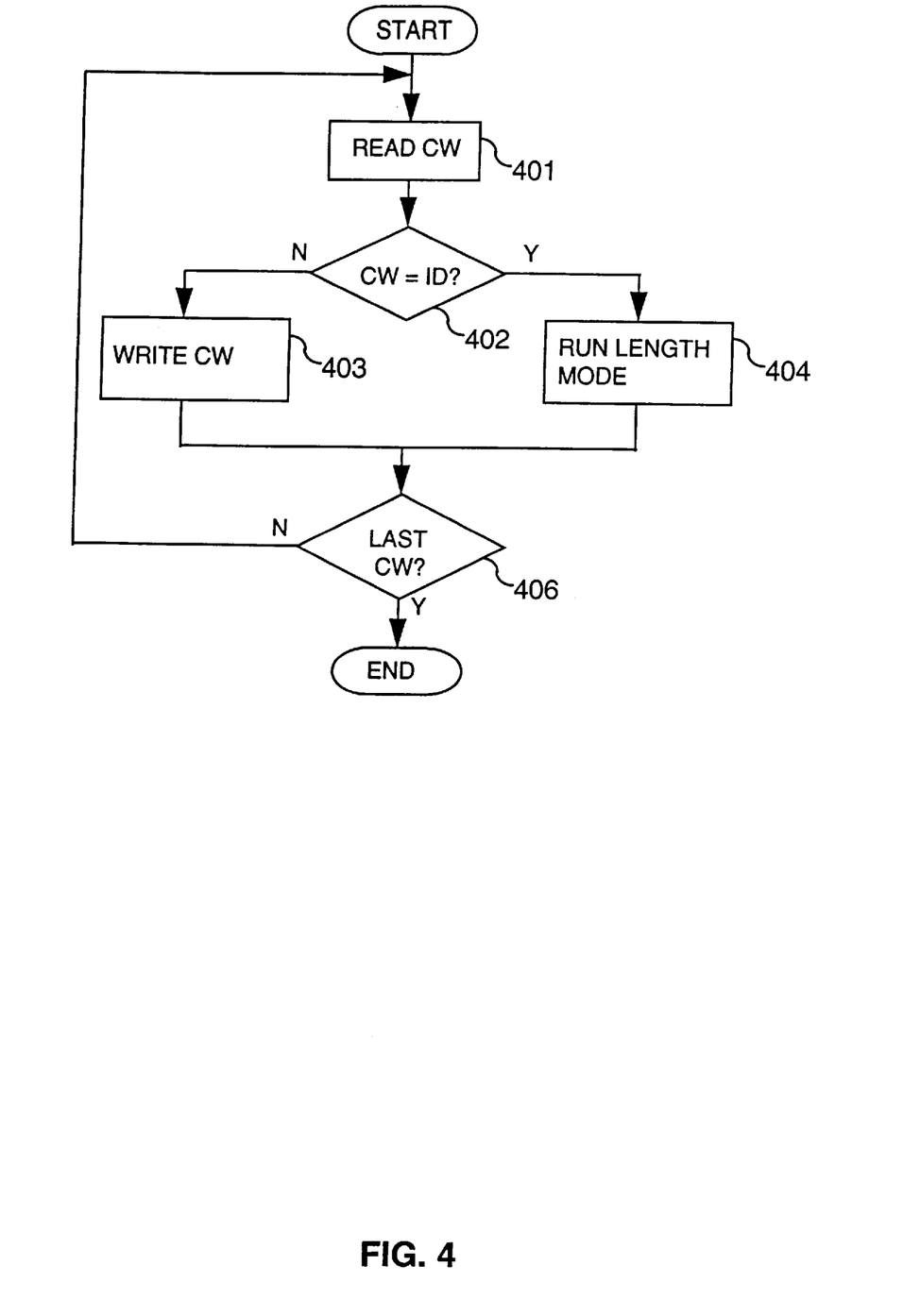
FIG. 4 illustrates a first embodiment of the decompression method.

FIG. 4 illustrates a first embodiment of the decompression process by reference to a flow diagram. The method described is suitable for the decompression of digital image data compressed in accordance with the method as described with reference to FIGS. 1 to 3.

The series of code words obtained by compression are successively read and converted into a series of uncompressed data groups.

In step 401 a first code word CW is read with a size fixed on compression, e.g., one byte. Step 402 checks whether this code word CW corresponds to the identification code word ID. If this is not the case, then in step 403 the code word CW is transmitted entirely as a data group GG. The method thus works in a copying mode as standard. If, on the other hand, the code word CW corresponds to the identification code word ID, then in step 404 a decompression mode is adopted in which the code word CW is decompressed to one or more data groups GG. The method according to this decompression mode is described in detail with reference to FIG. 5. This cycle is repeated for all the code words CW supplied, until a final code word CW is detected in step 406.

Figure 5:
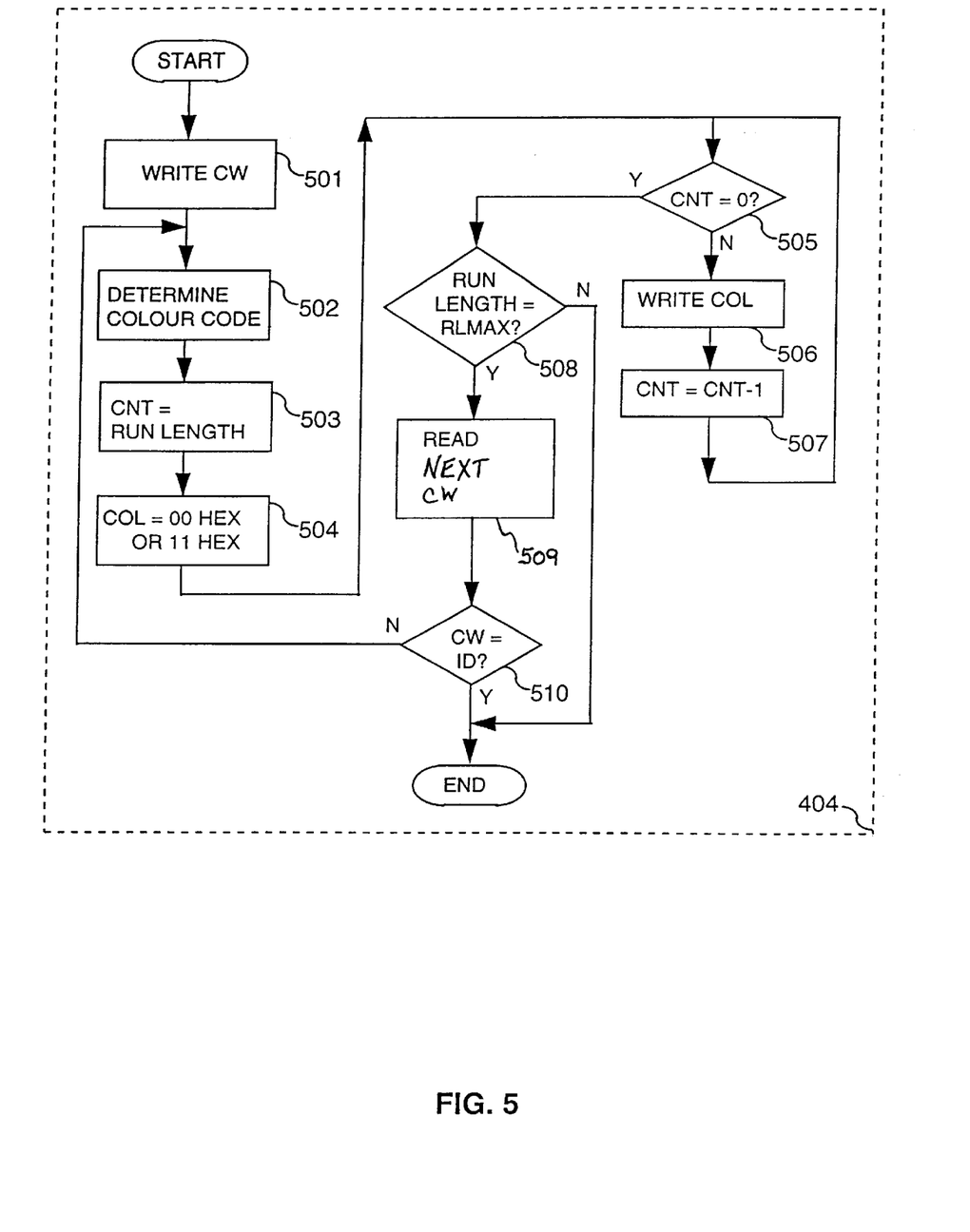
FIG. 5 is a further development of the step 404 ("run length mode") shown in FIG. 5.

The decompression step 404 in FIG. 4 is described in detail in FIG. 5 by way of a flow diagram.

A code word CW following the identification code word ID is read out of the series of code words in step 501. From this code word CW, the color code is split off from the run length in step 502. In step 503 a counter CNT is allocated the value of this run length while the variable COL is allocated the value of the color code in step 504. In this case, therefore, either a byte of completely white pixels or completely black pixels ($FF_{HEX}$ or $00_{HEX}$). A corresponding data group GG is then generated in a loop with the aid of the contents of the variable COL as often as indicated by the counter CNT. This is effected by step 505, which checks whether the counter CNT reaches the value zero, a generation step 506 for the data group GG corresponding to the contents of the variable COL and a deduction step 507 from the counter CNT.

If the loop described is terminated because the counter CNT reaches the value zero, step 508 checks whether the run length is identical to the maximum run length RLMAX for coding. If this is not so, the decompression step is left. Otherwise, the compression mode is not yet left because the next code word CW could include a remaining run length. A following code word CW is read in step 509. Step 510 checks whether this code word CW corresponds to the identification code word ID. In that case, the coded run length is exactly identical to the maximum run length for coding and the decompression mode must finally be left. If this is not the case, then the decompression mode is maintained and the above-described cycle is repeated.

A hardware implementation of the compression and decompression process as described above, follows. The main components are a counter, a run length coding and decoding unit, comparison modules, a number of buffers and control hardware for exact synchronization and interfaces. Hardware for control and synchronization is not described in great detail because it is well within the ordinary level of skill in the art in view of the present disclosure.

Figure 6:
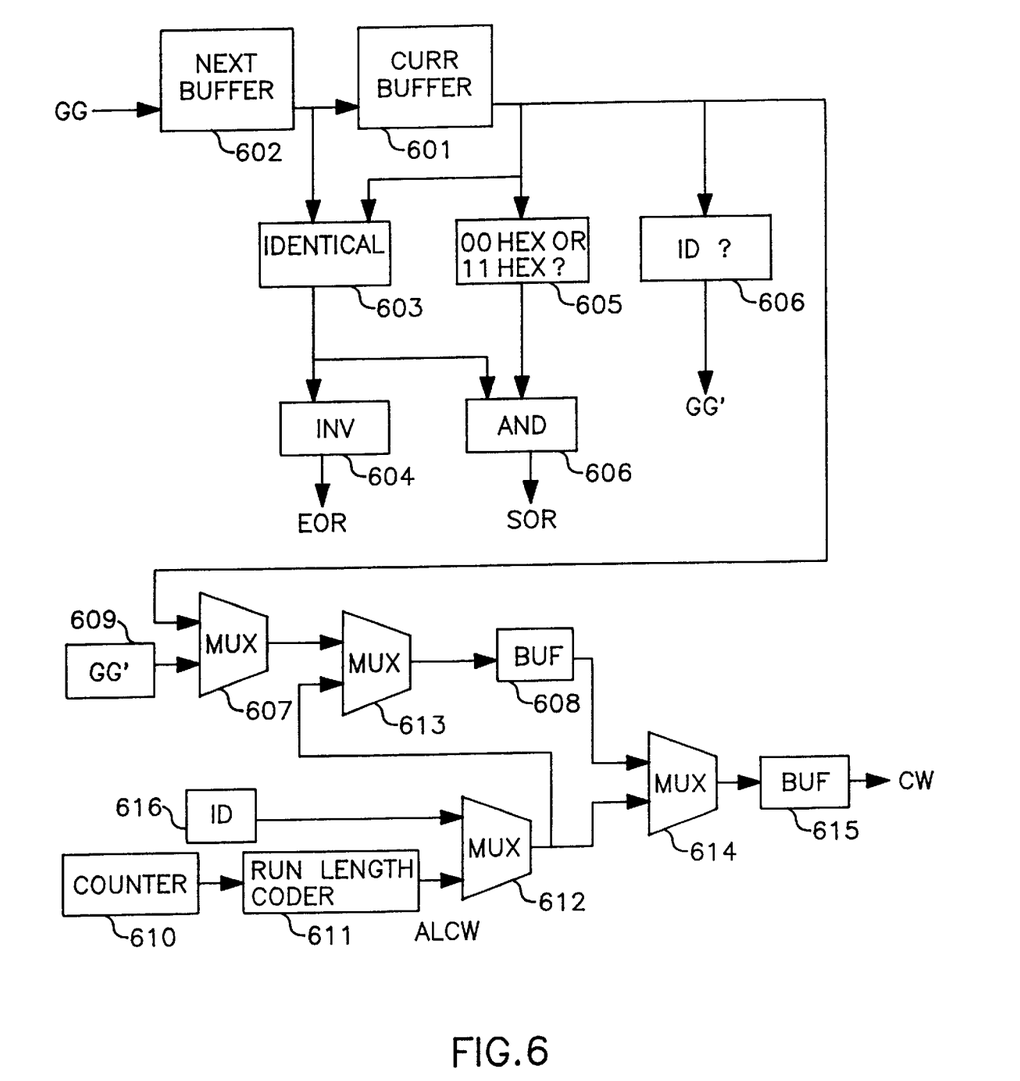
FIG. 6 shows a first compression system for performing the compression method described in FIG. 1.

FIG. 6 shows a hardware architecture of a compression system operating in accordance with the method described in FIGS. 1 to 3.

Here the data groups GG for compression are fed to the series-connected buffers 601 and 602. Buffer 602 contains the data group GG indicated by NEXT following on the data group GG stored in buffer 601 and indicated by CURR.

The start of a run length is detected by detecting whether the data group CURR in buffer 601 is identical to the data group in buffer NEXT 602. This is effected by the comparison module 603.

If this is not the case, a logic signal EOR representing the end of the run length is generated by way of an inverter 604.

Also, the comparison module 603 detects whether the said data groups consist entirely of logic "ZEROS" or "ONES" ($00_{HEX}$ or $FF_{HEX}$). If this is the case, and if the data groups are also identical, a signal SOR representing a start of the run length is generated via a logic AND gate 606. If this signal SOR is not generated, the data group CURR is written from buffer 601, via multiplexers 607 and 613, into buffer 608. Alternatively, the data group GG' from buffer 609 is written into buffer group 608 if the data group CURR from buffer 601 is found to be identical to the identification code word ID. The latter is detected by comparison module 606.

If the signal SOR is generated, the identification code word ID stored in register 616 is written in buffer 608 via multiplexers 612 and 613.

At the start of a run length, a counter 610 starts to run and temporarily no valid data are written in buffer 608. If the contents CNT of the counter 610 becomes equal to the maximum run length RLMAX for coding, the counter 610 is reset. The run length code word RLCW generated by the run length coding unit 611 is written in buffer 608 via multiplexers 612 and 613. The end of a run length is reached when the current data group CURR and the following data group NEXT are no longer identical. By detecting a data group GG, the run length code word RLCW can be written in buffer 608 at the time that the last data group GG of the run length is in the buffer 601. In a following cycle the next data group GG can be copied in the normal way.

One exception occurs if the end of a run length exactly corresponds to the maximum counter state RLMAX. The run length code word RLCW and the identification code word ID must now be generated simultaneously. Buffer 615 is added for this purpose and together with buffer 608 forms a shift register. In this exceptional case, the run length code word RLCW is written via multiplexer 614 while the identification code word ID is written in buffer 608. As a result of the starting point of no local data expansion, these buffers 608 and 615 contain no valid data at that time.

Figure 7:
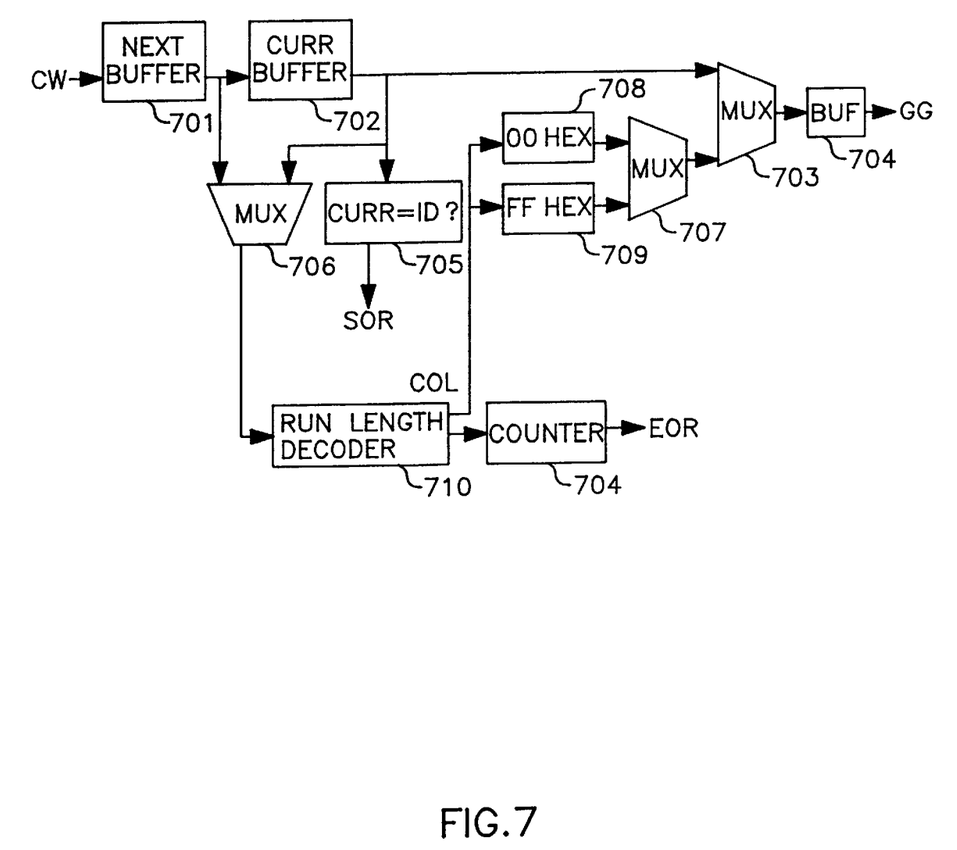
FIG. 7 shows a first decompression system for performing the decompression method described in FIG. 4.

FIG. 7 describes a hardware architecture of a decompression system operating in accordance with the method described in FIGS. 4 and 5. Hardware for control and synchronization is not described in great detail because it is well within the ordinary level of skill in the art, in view of the present disclosure.

The series of code words CW for decompression are fed to the buffers 701 and 701. The first code word CW is indicated by CURR and is stored in buffer 702 and the following code word CW indicated by NEXT is stored in buffer 701. In the copying mode, the code word CURR is copied from buffer 702 via multiplexer 703 to buffer 704.

In order to keep the produced data stream in progress, the identification code word ID and the run length code word RLCW must be evaluated simultaneously on a transition to the decompression mode. A comparator unit 705 checks whether the code word CURR is equal to the identification code word ID. If it is, this unit 705 generates a signal SOR representing a start of the run length. The following code word NEXT must be decoded as run length. For this purpose it is fed to a run length decompression unit 710 via a multiplexer 706. The run length generated by this unit 703 is then loaded in a counter 704. Finally, this counter 704 again generates a signal EOR representing an end of the run length.

Multiplexers 703 and 707 are so connected that, during the deduction of the run length via counter 704, a data group of only logic "ZEROS" or only logic "ONES" ($00_{HEX}$ or $FF_{HEX}$) is written in the output buffer 704. These data groups, in this case a data group of a size of one byte, are stored in registers 708 and 709. These values are selected by reference to the contents of the color information COL generated by the run length decompression unit 710.

Not only could the method embodiments of the present invention be implemented using discrete electrical circuits, but they could also be implemented as programs being executed by a general purpose computer, or as an application specific integrated circuit ("ASIC"), among other ways.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method of compressing digital image data, organized as successive data groups of bits, the contents of which are the values of pixels of an image, comprising:
   checking a first condition of whether a current data group has the same contents as at least one data group following said current data group;
   inserting, if the first condition is satisfied, an identification code indicating that a following set of bits represents compressed image data;
   replacing, if the first condition is satisfied, said data groups of the same content by a compression code representing these data groups; and
   copying, if the first condition is not satisfied and independently of a previously-generated code, the current data group and, as long as said first condition is still not satisfied, corresponding successive data groups without adding an identification code to said current data group and said successive data groups;
   repeating the steps of checking and either inserting and replacing or copying, respectively, for the subsequent data groups.

2. A method according to claim 1, wherein the compression code includes a predetermined number of bits.

3. A method according to claim 2, in which the step of replacing includes:
   coding up to a predetermined number of consecutive data groups having the same contents.

4. A method according to claim 3, wherein the step of coding includes:
   determining only the number of identical data groups of which the bits in each data group are identical to one another.

5. A method according to claim 1, wherein the compression code includes a predetermined number of bits and, under predetermined circumstances, at least one predetermined repetition code.

6. A method according to claim 5, wherein the step of replacing includes:
   coding up to a predetermined number of consecutive data groups having the same contents; and
   generating, if the number of consecutive data groups having the same contents is greater than a predetermined limit, a repetition code.

7. A method according to claim 6, wherein the repetition code is identical to the identification code.

8. A method according to claim 6, wherein the predetermined limit equals a maximum value that can be encoded with the predetermined number of bits.

9. A method according to claim 8, wherein the repetition code is identical to the said maximum value.

10. A method according to claim 9, wherein step of coding ends the compression code with the identification code if the number of data groups for coding is identical to the said maximum value.

11. A method according to claim 1, wherein the step of replacing includes exchanging a data group by another predetermined data group if the data group is identical to the identification code.

12. A method according to claim 1, wherein:
   the pixels of an image are arranged in consecutive image lines; and
   the bits of a data group originate from at least two adjacent image lines.

13. A method according to claim 1, wherein a bit of a data group corresponds to the value of a pixel of the image.

14. A method according claim 1, wherein the data groups are organized into units of 4 bits.

15. A method of decompressing digital image data, coded with consecutive codes, each of said codes having the same preset number of bits, to form consecutive data groups of bits having as contents the values of pixels of an image, comprising:
   providing a reference identification code conforming to said preset number of bits;
   checking a first condition of whether a current code is identical to said predetermined identification code;
   restoring, if the first condition is satisfied, at least two data groups of decompressed digital image data according to a predetermined number of bits of the code;
   copying, if the first condition is not satisfied, the contents of the current code under investigation as the corresponding decompressed digital image data;
   repeating said steps of checking and one of copying and restoring, respectively, for codes following said current code.

16. A method according to claim 15, the step of restoring includes:
- identifying predetermined repetition codes in the compression code; and
- replacing the repetition coeds by data groups.

17. A compression system for compressing digital image data to be fed thereto, the image data including consecutive data groups of bits having as contents the values of pixels of an image, comprising:
- selection means for checking a first condition of whether a current data group has the same contents as at least one data group following said current data group;
- compression means for inserting, if the first condition is satisfied, an identification code indicating that a following set of bits represents compressed image data, and for replacing, if the first condition is satisfied, the data groups of the same content by a compression code representing the data groups;
- copying means for copying, if the first condition is not satisfied and independently of a previously-generated code, the current data group and, as long as said first condition is still not satisfied, corresponding successive data groups without adding an identification code to said current data group and said successive data groups; and
- control means for feeding the data groups consecutively to the selection means and to the compression means if the first condition is satisfied and for feeding the first data group to the copying means if the first condition is not satisfied.

18. A compression system according to claim 17, wherein the compression means generates compression code with a predetermined number of bits.

19. A compression system according to claim 18, wherein the compression means encodes up to a predetermined number of consecutive data groups having the same contents.

20. A compression system according to claim 17, wherein the compression means encodes only the number of identical data groups of which the bits in each data group are identical to one another.

21. A compression system according to claim 17, the compression means generates only compression code of a predetermined number of bits and, under predetermined circumstances, at least one or more predetermined repetition code.

22. A compression system according to claim 21, wherein the compression means encodes up to a predetermined number of consecutive data groups having the same contents and generates the repetition code if the number of consecutive data groups having the same contents is greater than a maximum number that can be coded with the predetermined number of bits.

23. A compression system as in claim 22, wherein the predetermined limit equals a maximum value that can be encoded with the predetermined number of bits.

24. A compression system according to claim 22, wherein the repetition code is identical to the identification code.

25. A compression system according to claim 22, wherein the repetition code is equal to the said maximum value.

26. A compression system according to claim 17, wherein the compression means also replaces a data group by another predetermined data group if the data group is identical to the identification code.

27. A compression system according to claim 17, wherein the pixels of an image are arranged in consecutive image lines, and bits of a data group originate from at least two adjacent image lines.

28. A compression system according to claim 17, wherein a bit of a data group corresponds to the value of a pixel of the image.

29. A compression system according to claim 17, wherein the data groups are organized into of units of 4 bits.

30. A scanning and printing system provided with a compression system according to any one of claims 17 to 29.

31. A computer provided with a compression system according to any one of claims 17 to 29.

32. A decompression system for decompressing consecutive codes of digital image data to form consecutive data groups of bits having as contents values of pixels of an image, each of said codes having the same preset number of bits, the system comprising:
- selection means for storing a reference identification code conforming to said preset number of bits and for checking a first condition of whether a current code is identical to said reference identification code;
- decompression means for replacing, if the first condition is satisfied, the code by data groups corresponding to that code;
- copying means for replacing, if the first condition is not satisfied, the contents of the current code as the corresponding decompressed digital image data;
- control means for successively feeding yet unreplaced codes to the selection means, and for feeding the code to the decompression means if the first condition is satisfied else feeding the code to the copy means.

33. A decompression system according to claim 32, wherein the decompression means identifies predetermined repetition codes in the compression code and replaces the repetition codes by data groups.

* * * * *